H. J. BRENNECKE.

SAFETY GOGGLES.

APPLICATION FILED FEB. 3, 1919

Reissued May 13, 1919. 14,645.

Witness:
R. L. Farrington

Inventor,
Herman J. Brennecke,
By Norman Tina, Att'y.

UNITED STATES PATENT OFFICE.

HERMAN J. BRENNECKE, OF CHICAGO, ILLINOIS, ASSIGNOR TO ROBERT MALCOM, OF CHICAGO, ILLINOIS.

SAFETY-GOGGLES.

14,645. Specification of Reissued Letters Patent. Reissued May 13, 1919.

Original No. 1,207,849, dated December 12, 1916, Serial No. 109,220, filed July 14, 1916. Application for reissue filed February 3, 1919. Serial No. 274,816.

*To all whom it may concern:*

Be it known that I, HERMAN J. BRENNECKE, a citizen of the United States, residing at Chicago, in the county of Cook and State of Illinois, have invented certain new and useful Improvements in Safety-Goggles, of which the following is a specification.

My invention relates to goggles and eye glasses and has particular reference to the construction thereof for the purpose of greater safety and comfort to wearers using goggles as a protection against extreme heat in certain lines of employment, as a protection against certain rays of light injurious to the eyesight, such as violet rays and the light tending to produce occupational diseases of the eye, etc.

The objects of the present invention are to provide in a commercially practical form a goggle structure adapted to be made out of material that is a poor conductor of heat, such as wood or fiber; to provide a structure that is light in weight and one that eliminates face-contacting metal parts; to provide for comparatively inexpensive and convenient renewal and exchangeability of the different parts, so that when one section or part of the goggles as a whole is broken or damaged it may be quickly and cheaply replaced without loss of the sound portions of frames or lenses, and to provide these improvements in a structure which, as a whole, is as neat and pleasing in general appearance as more expensive structures having special regard for that feature.

With the above named general objects in view this invention consists in the novel construction, combination and arrangement of parts, all as hereinafter described in detail, illustrated in the accompanying drawings and more particularly pointed out in the appended claims.

Figure 1:
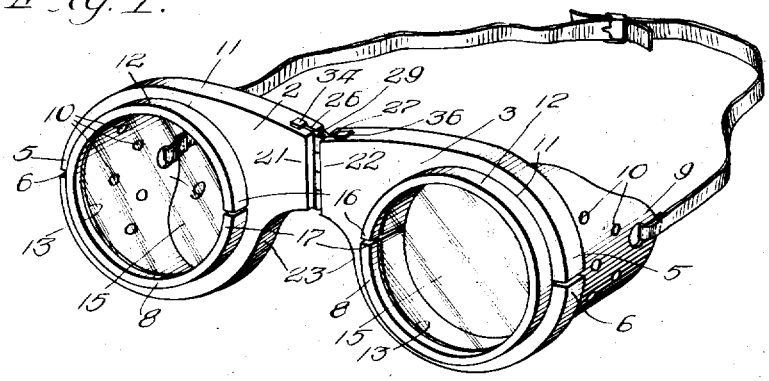
Figure 1 is a perspective view of a pair of goggles embodying my invention.
Figure 2:
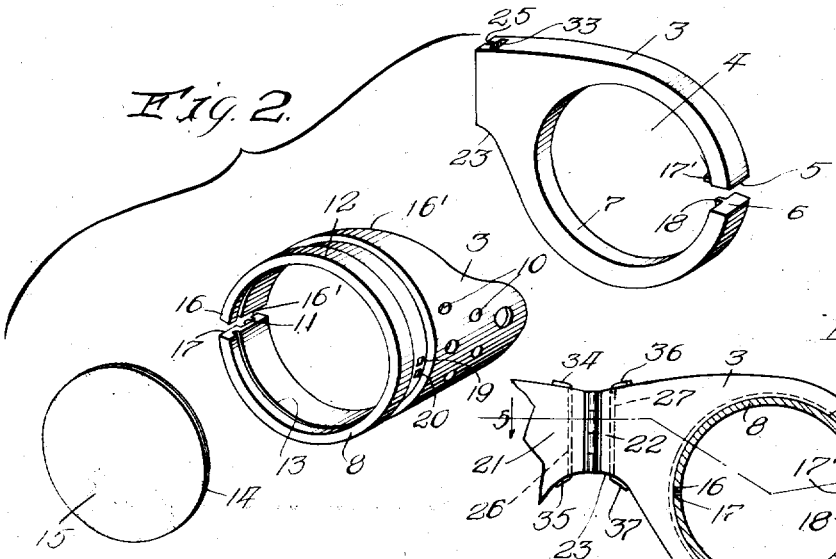
Fig. 2 is a perspective view of one of the identical lens frames, with its parts of main frame, shield and lens-holding frame or ring, and lens separated.

Referring in detail to the several views, the present invention is shown embodied in the hinge type of goggles, which embodiment includes improvements in the hinge connection for two main frames 2 and 3 which are substantially identical so that a description of the parts of one practically describes both. The members 2 and 3 are flat frames of fiber, or other material suitable for the purposes hereinafter more fully set forth, and each of these frames has an opening 4 therein which forms a ring with ends 5 and 6 which make it an open ring. In Fig. 2 the ends 5 and 6 are shown forced apart for the sake of more clearly showing construction, but they are normally in contact with each other as in Figs. 1 and 3 and when forcibly separated to a limited extent are returned to normal by the elasticity of the material of which the parts 2 and 3 are made, all materials adapted for the present purpose having sufficient elasticity for that purpose. However, as will hereinafter appear, elasticity in the material is not the sole reliance that the ring may remain substantially closed.

In the opening 4, or against the wall —7— thereof, is placed a fiber or heavy paper ring 8, which is also a split ring and has as a preferably integral part thereof a curved side shield portion 9 with ventilation holes 10 therein. In the ring 8 is a groove 11 the bottom of which is engaged by the inner periphery 7 of the ring 3. Hence the parallel sides of the groove 11 engage opposite sides of the body 3. The groove 11, as shown, is an exterior groove. Opposite an outer flange 12 produced by the formation of the groove 11 is an interior groove 13 that is of sufficient width to receive the circumferential edge 14 of a lens 15 of suitably colored or plain glass or other transparent material according to the particular artisanship in which the goggles are employed. Where eye-straining lights are encountered and these are of various colors the coloring of exchangeable lenses will be such as to counteract the effect of the eye-straining light. 16 and 17 represent the ends of the ring 8 which are also normally in contact and forcibly separated in Fig. 2 to clearly locate the relative positions of the grooves 11 and 13 and flanges 12 and 16′ formed by the groove 11, the flange 16′ being extended into the shield 9 along a portion of the periphery of the ring 8.

Figure 3:
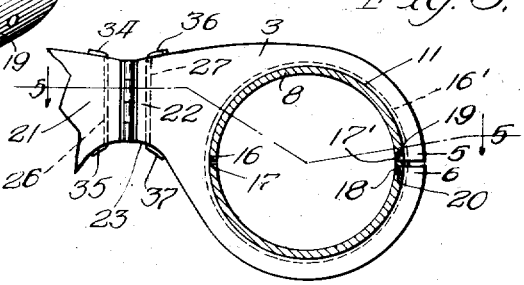
Fig. 3 is a side elevation, partly in section, and partly broken away, of my invention.

As shown in Figs. 2 and 3 in a simple and unobstrusive form provision may be made to positively hold the ring portion of the body 2 or 3 closed, or to hold the ends 5 and 6 in contact with each other. For this purpose lugs 17′ and 18 are shown projecting inwardly from the wall 7 at the ends 5 and 6. The lug 17′ is snapped into a recess 19 and the lug 18 into a recess 20. The lugs 17′ and 18 may, if preferred, represent the positions of a pair of screws the heads of which would, of course, then show on the periphery of the ring of the part 3 or 2.

Figure 4:
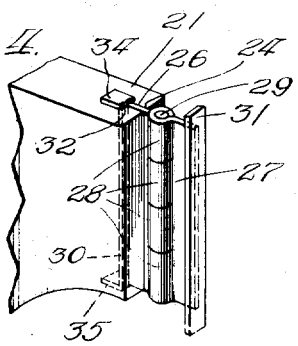
Fig. 4 is a perspective view of a broken away portion of one of the hinged sections showing the manner in which the hinge leaf is embedded in and connected with the non-metallic body.
Figure 5:
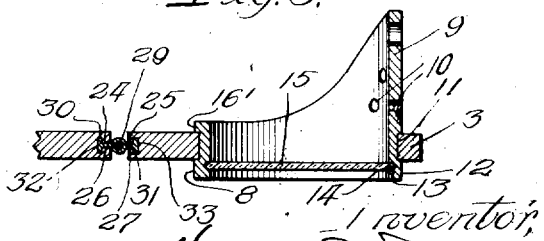
Fig. 5 is a section taken substantially on line 5—5 of Fig. 3.

The ring portions of the parts 2 and 3 are spaced apart by adjacent bridge portions 21 and 22 the lower edges of which are curved to provide a nose-piece of nose-recess 23. In the vertical edges of these portions are formed kerfs or slots 24 and 25 adapted to receive leaves 26 and 27 of a hinge, the knuckle portions of which are labeled 28 and are held together by a usual pintle 29. To securely fasten these leaves against longitudinal movement in their seats 24 and 25 and against outward movement in a horizontal direction the outer edges of the leaves 26 and 27 are provided with thin bars 30 and 31 which engage slots 32 and 33 arranged at right angles to the slots 24 and 25 and project beyond the ends of the leaves as shown best in Fig. 4. The projecting portions are bent over the bodies 2 and 3 and form holding clips 34 and 35 on one leaf and 36 and 37 on the other leaf. This obviates the use of screws. If the leaves 26 and 27 are regarded as a single flexible connection their function would be the same so far as their connection with the parts 21 and 22 is concerned.

I claim as my invention;

1. A pair of goggles consisting of nonmetallic frames having openings for lens frames cut therein and forming expansible open rings, and lens frames having lenses therein, said lens frames being arranged to be held in said open rings.

2. A pair of goggles consisting of a pair of fiber frames connected together and forming main frames, said main frames having meeting ends normally meeting and forming expansible rings which may be opened to insert therein lens-carrying frames, and lens-carrying frames held in said rings.

3. A pair of goggles consisting of main frames connected to move angularly relatively to each other and forming split rings which may be expanded to engage and hold lens-carrying frames consisting of grooved rings which are expansible to engage and hold lenses.

4. The combination in a pair of goggles, of split ring main frames, and split ring lens frames, the former engaging the latter and the latter adapted to engage lenses, and means for preventing relative movement of lens frames and lenses, and main frames and lens frames.

5. A pair of goggles consisting of a pair of pivoted together frame members having lens frame portions which are substantially split rings, split ring lens holders or lens frames having means thereon to support lenses therein, and means for holding the first mentioned split rings closed against accidental expansion.

In testimony whereof I have hereunto signed my name.

HERMAN J. BRENNECKE.